United States Patent [19]

Niklsbacher

[11] Patent Number: 5,270,709
[45] Date of Patent: Dec. 14, 1993

[54] KEYBOARD UNIT FOR HANDLING PROCESSOR UNITS

[76] Inventor: Ferdinand Niklsbacher, Langusova 15, Ljubljana, Yugoslavia

[21] Appl. No.: 607,555

[22] Filed: Oct. 31, 1990

[30] Foreign Application Priority Data

Nov. 1, 1989 [CH] Switzerland ............... 1-03952

[51] Int. Cl.⁵ ............................................. B41J 5/10
[52] U.S. Cl. ................................. 341/20; 341/22; 341/23; 400/489; 345/168
[58] Field of Search ........................... 341/20–22, 341/23; 400/87, 485, 489, 479; 200/DIG. 2; 340/706, 709, 711

[56] References Cited

U.S. PATENT DOCUMENTS

| 4,442,506 | 4/1984 | Endfield | 341/22 |
| 4,913,573 | 4/1990 | Retter | 400/489 |

FOREIGN PATENT DOCUMENTS

| 0050565 | 4/1982 | European Pat. Off. . | |
| 0224600 | 11/1985 | European Pat. Off. | 400/489 |
| 0279553 | 8/1988 | European Pat. Off. . | |
| 87225 | 7/1980 | Japan | 341/23 |
| 8204151 | 11/1982 | PCT Int'l Appl. . | |
| 2076743 | 12/1981 | United Kingdom | 400/489 |
| 2131746 | 6/1984 | United Kingdom . | |
| 8902369 | 3/1989 | World Int. Prop. O. | 400/439 |

Primary Examiner—Donald J. Yusko
Assistant Examiner—Michael Horabik
Attorney, Agent, or Firm—Henry M. Feiereisen

[57] ABSTRACT

A keyboard unit with several ergonomically arranged keys, the keyboard unit consisting partly of a knob having an upper surface suitably shaped for the support of the inside hollow palm of the guiding hand, the knob having a frontal surface with a row of keys ergonomically operational by the fingers of the hand, and on an inside surface a minimum of one key to be actuated by the thumb, the knob being mobile in two coordinate directions, that is, in the longitudinal direction of the arm and perpendicular to it, covering an entire area of input positions, giving the final choice to the finger selection of the proper key for the intended input.

7 Claims, 2 Drawing Sheets

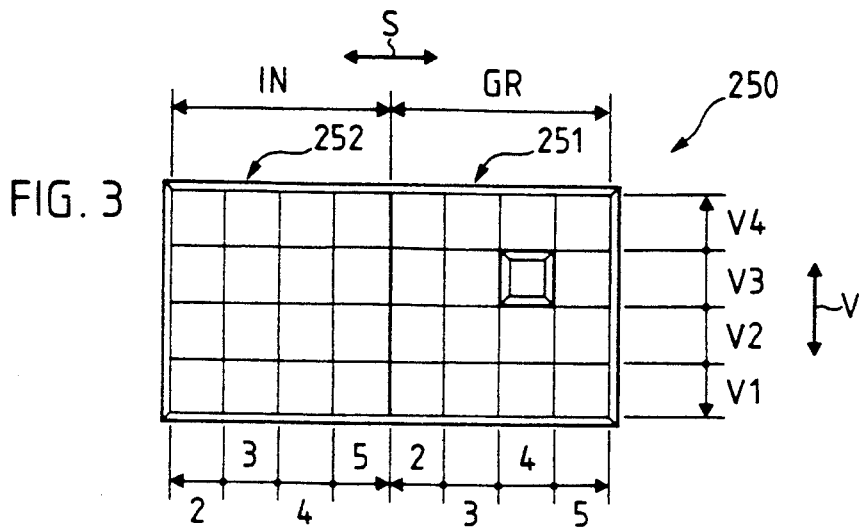
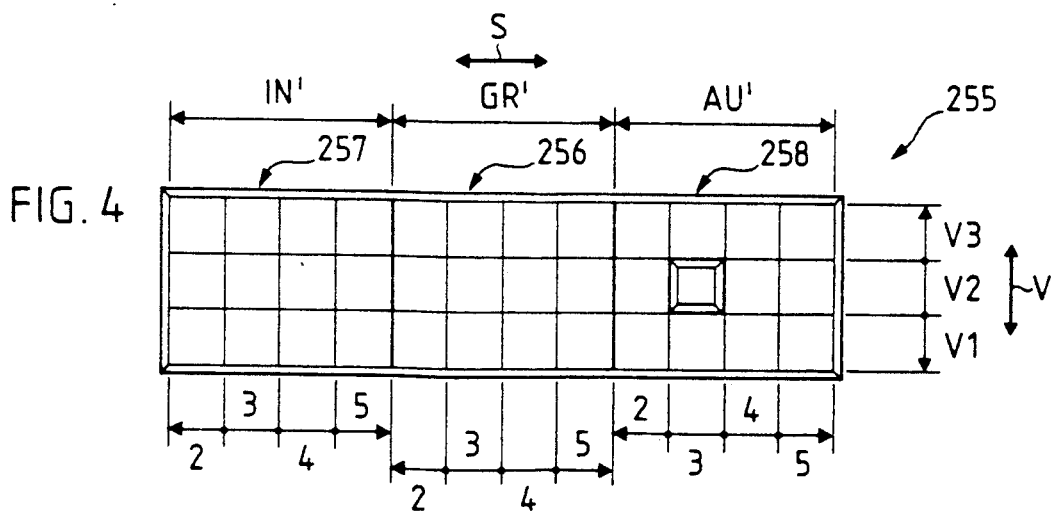
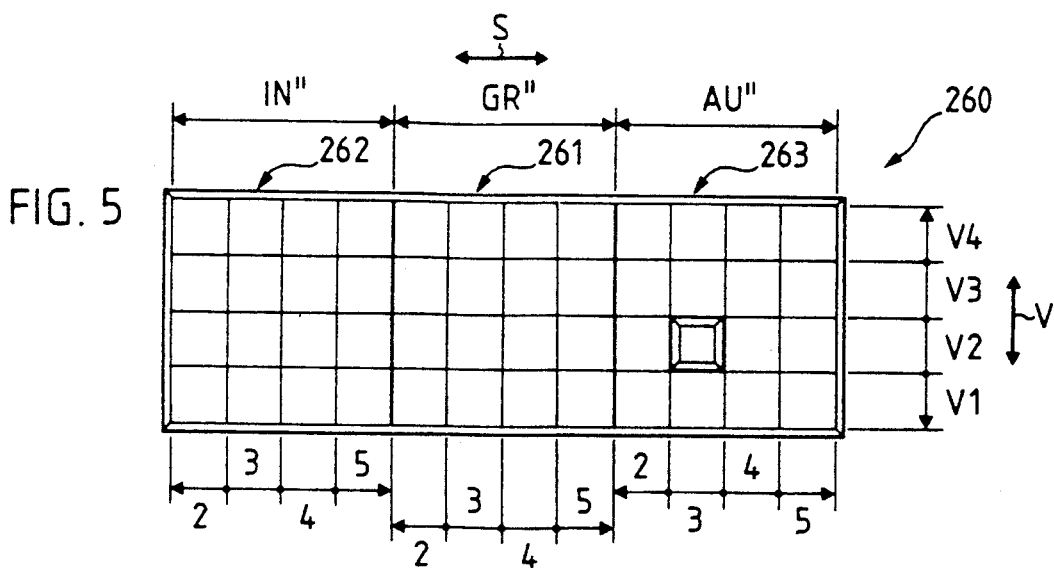

KEYBOARD UNIT FOR HANDLING PROCESSOR UNITS

BACKGROUND OF THE INVENTION

The present invention relates generally to a keyboard unit with several ergonomically arranged keys to operate at least one processor unit operationally connected to the processor unit.

Various conventionally built keyboard units are known, designed to operate processor units, handling apparatuses, industrial robots and many other similar instruments and large machineries. These keyboard units are very limited in their performing capacity and therefore can not be introduced into more complex systems. Another disadvantage of these known keyboard units is that the position of the operator's arms and hands is unfavorable during the operation, which leads to an unnatural position of the body, and results in cramps, convulsions and muscle tensions. This in turn often leads to chronicle muscle inflammations in the upper torso and arms.

An objective of this invention is to create a keyboard unit which not only offers a wide-reaching key accessibility, but is also ergonomically shaped to adapt to the anatomy of the human hand.

SUMMARY OF THE INVENTION

The present invention provides a keyboard unit in form of a knob, with an upper surface shaped like the inner surface of a human hand, taking also part of the arms weight. Integrated into the front end of the knob is a row of keys ergonomically positioned such that the keys are in reach of the fingers. On the side of the knob, there is at least one key operational by the thumb. Further, when in use, the knob is movable forward and/or backwards, as well as into any coordinate system sideways, to provide access to all necessary positions for signal or data entry.

BRIEF DESCRIPTION OF THE DRAWINGS

The forgoing and additional objectives and advantages of the invention will become more apparent as the following detailed description is read in conjunction with the accompanying drawings.

FIG. 3 is the first schematical presentation of the key input field of the keyboard unit according to FIG. 1 and FIG. 2, shown for the right hand keyboard unit.

FIG. 4 is the second schematical presentation of the key input field of the keyboard unit according to FIG. 1 and FIG. 2, shown for the right hand keyboard unit.

FIG. 5 is the third schematical presentation of the key input field of the keyboard unit according to FIG. 1 and FIG. 2, shown for the right-handed keyboard unit.

DETAILED DESCRIPTION OF THE PREFERRED EMBODIMENT

Figure 1:
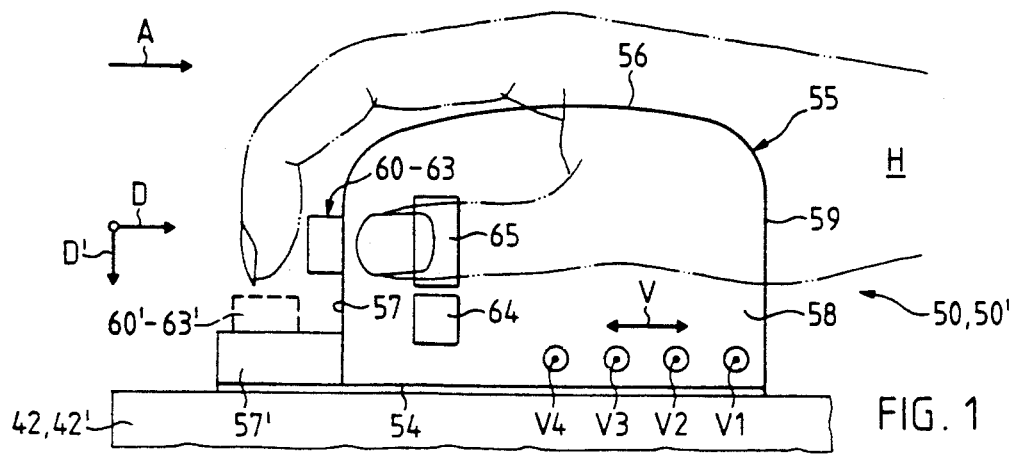
FIG. 1 is a side view of the right-handed keyboard unit with the keys presented.

Referring to the drawings and to FIG. 1 in particular, shown is a keyboard unit 50, designed for a right hand H of the operator, schematically drawn by a dash-point-dash line. Another keyboard unit 50', not specifically represented in the drawing, for the left hand of the operator has an analogue design. Both keyboard units 50 and 50' together represent an operative keyboard 300 for a processor unit that is not shown.

Figure 2:
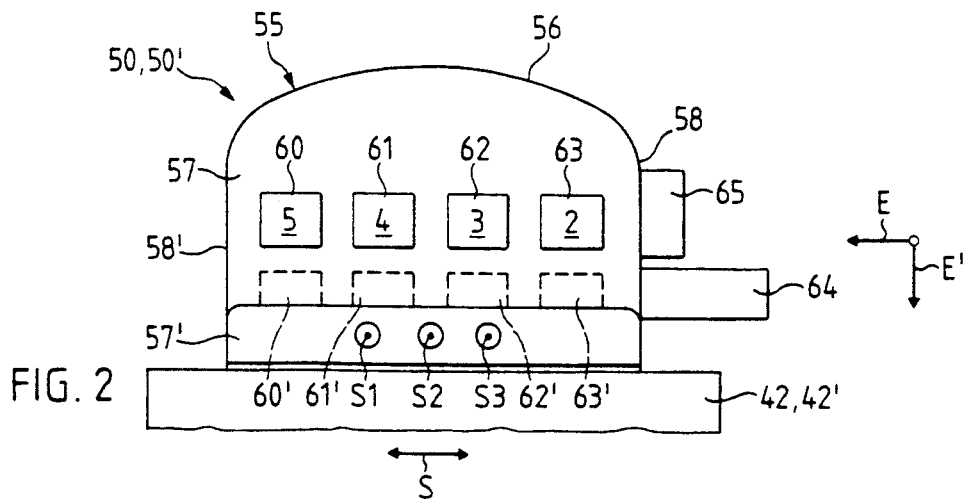
FIG. 2 is an elevation of the keyboard unit, illustrated in the direction of arrow A, as indicated in FIG. 1.

In FIG. 1 and FIG. 2 the keyboard unit 50 with suitably arranged keys includes a knob-like headpiece 55, which has an upper surface to match comfortably the inner surface of the hand H, a front surface 57 with a possible step 57', two side surfaces 58, 58' as well as a back surface 59.

Located on the front side are several keys, spaced apart and forming a first group of keys 60, 61, 62, and 63 in a row corresponding to the position of the operator's hand and fingers, to be selectively activated by the movement of the fingers in the direction of arrow D. Another group of keys corresponding to the keys 60, 61, 62, and 63 may be built into the step 57', containing the keys 60', 61', 62', and 63, activated by the movement of the fingers indicated by the arrow D'. On the side surface 58 of the right hand keyboard (for the left hand on 58') at least two more keys 64 and 65 may be activated by the thumb, although the thumb is not actually presented in FIG. 2, in the direction indicated by arrows E and E', taking eventually the task of a space bar and a shift lock key. FIG. 1 and FIG. 2 show the position of the keys only for the operator's right hand H. For the left hand they have an analogue opposite position.

The knob 55 of the keyboard unit 50 or 50' is guided by guiding elements (not shown), but which are mounted on the bottom, along the upper surface of the supporting element 42 or 42'. The guiding elements are operationally positioned such, that the keyboard knob 50 may easily be shifted in the two coordinate directions, indicated by the two arrows V (FIG. 1) and S (FIG. 2). The movements of the knob in the directions V and S are relative to the said supporting element 42 or 42' FIG. 1.

The shifting movement in the direction of arrow V may be divided into four exactly defined steps V1, V2, V3, and V4 (example shown in FIG. 1) with slightly resisting rests in between two adjacent positions and stops at the end positions, whereby the position V2 may be considered as a basic position of each partial key input field. It is also possible to decrease the number of steps eventually, e.g., to three, or to increase them within practical limits.

The shifting motion, as presented in FIG. 2 in the direction of arrow S may be preferably maintained in three steps S1, S2, and S3, with the said resisting rests and end stops, whereby the central position S2 can be considered as a basic one.

FIG. 2 shows an elevation of keyboard unit 50, without the hand, and presents the arrangement on the front surface 57 of the knob 55 with the keys 60, 61, 62, and 63, also the corresponding arrangement on the step 57' of the keys 60', 61', 62', and 63', as well as the location of the keys 64 and 65 on the side surface 58.

To clarify the action of individual fingers, the keys 60 to 63 and 60' to 63' for said fingers are marked in the drawing by numbers 2, 3, 4, and 5 and arranged according to the human hand. The forefinger 2 will activate key 63 or 63', the middle finger 3 the key 62 or 62', the ring finger 4 the key 61 or 61' and the little finger 5 the key 60 or 60'. To activate the keys 60 to 63 as shown in FIG. 1, a gentle pressure of the corresponding finger in the direction of arrow D is sufficient; and to operate the keys 60' to 63', a slight stretching of the corresponding finger in the direction of arrow D' is adequate.

The shift lock key 65 may be positioned lateral on the knob 55 as shown in FIG. 2 and activated with a gentle pressure of the thumb in the direction of arrow E and the key 64, which may substitute the space bar, by a slight movement of the thumb in the direction indicated by the arrow E'.

The knob 55 or 55' of any of the individual keyboard units preferably has as a boxlike casing, containing key contact elements operationally connected with the keys 60, to 63 and 60' to 63' as well as the keys 64, 64' and 65, 65', including all the switching elements. By activating an individual key after reaching an intended position of the knob 55 relative to the steady basic unit 42, 42', the signal given through the said knob position and the key selection should be transmitted preferably optronically, electromagnetically or by any other means without a material mechanical touch, if it is not explicitly required to use a pure mechanical transmission.

The function of the keys 60 to 63 respectively 60' to 63' in connection with the motions in the directions indicated by arrows V and S as well as the function of the keys 64, 65 in relation to correspondingly performed input fields and input regions is described in the following:

FIG. 3 shows, as the first variation, a complete key input field for the right hand 250 of the keyboard unit 50 (FIG. 2). The said key input field 250 is divided into two partial key input fields: 251 and 252, with the first one, number 251, presenting a basic or ground position GR, and the second one number 252 having an inner position IN of the knob 55. At the key input field 250 it is possible to place the movable knob 55 according to the step motions S2 and S3 in the direction of arrows S into the required partial key field and at the same time it is also possible, according to the step motion V1 to V4 in the directions of arrow V, to select the required step V1 to V4, containing the wanted signal and then immediately activate the intended key 2, 3, 4, or 5 by a slight pressure of the corresponding finger. The key input field 250 contains, as presented in FIG. 3, thirty-two not identified key functions, divided into horizontal lines and vertical columns, whereby the columns are numerated from 2 to 5, indicating the fingers to operate them since the column 2 has to be actuated by the forefinger, 3 by the middle finger, 4 by the ring finger and 5 by the little finger. In this example of the key input field 250, the keys 64 and 65 operate independently of the position of the knob 55 and have the function of the space bar and shift lock key respectively.

Two symmetrically opposite drawings of the key input field would present a full input region 250 and contain 64 key functions plus the four functions of the keys 64, 65, 64' and 65'. Implementing also the secondary set of keys 60' to 63' on the knob step 57' (FIG. 1 and 2), the capacity of the keyboard unit 50 would be 66 key function per hand or for the total input region composed of the two input fields 250 and 250' a number of 132 key functions for both hands. The number of input signals is even considerably higher by utilizing the shift and code keys.

FIG. 4 shows another variation of a key input field 255, representing it again for the right hand, proposed for the keyboard unit 50 according to FIG. 1 and 2.

The difference between this key input field 255 and the previously discussed key input field 250 FIG. 3 is in the distribution of said input field into three partial key input fields 256, 257 and 258, the 256 to be considered as the central and basic or ground partial key input field GR', 257 the inside partial key input field IN' and 258 the outside partial key input field AU'.

In the key input field 255 it is intended to operate in three partial key input fields, reaching them by steps S1, S2 and S3 by the first component motion of the knob 55 in the directions indicated by arrows S into the required partial key input field and simultaneously by the motion in the required line V1, V2 or V3, in a resultant moving course following the second component direction indicated by the arrow V, placing the said knob with its frontal keys over the proper line, containing the intended signal, and actuate the corresponding key. The sequence of this straight motions may be executed directly, without passing through the basic position with the knob 55 from any signal position to the next one.

The key input field 255 contains, as presented in FIG. 4, thirty-six unidentified input key functions for one hand plus two input key functions offered by the lateral keys 64 and 65. The full key input region consisting of two key input fields for both hands plus the lateral keys functions offers a capacity of seventy-six key functions, not considering the implementation of the secondary key group (resulting in 148 key input signals). The number of input signals is even considerably higher by implementing shift and code keys.

A further advantage by introducing this particular key input field 255 is that there is only one step from the basic position GR to reach any intended line in a partial field in directions V and only one step to reach any partial field in directions S to be made by the knob 55. The maximum distance may be covered over the space of two steps in any resultant direction from one extreme position to the other.

FIG. 5 is representing a third variation of a key input field 260 for the right hand keyboard unit 50 according to FIG. 1 and FIG. 2.

The difference compared with the key input field 255 of FIG. 4 is in the number of lines in the partial key input fields increased to four: V1, V2, V3 and V4 whereby the line V2 takes the basic position in every partial key input field. The key input field 260 is distributed into three partial key input fields 261, 262 and 263 whereby the partial key input field 261 takes the basic position GR", 262 the inner position IN" and 263 the outer position AU". The longest distance in a combined motion between two extreme positions of the knob 55 goes over three steps and one or two steps from the basic position.

The key input field 260 contains, according to its presentation (FIG. 5) forty-eight unidentified key functions plus two by the keys 64 and 65 (FIG. 1 and 2) and a total for the complete region for both hands including keys 64, 65 and 64' and 65' of one hundred key functions without using the said secondary keys (resulting in 198 key input signals). By implementing shift and code keys, the number of input signals would be relatively higher.

Figure 6:
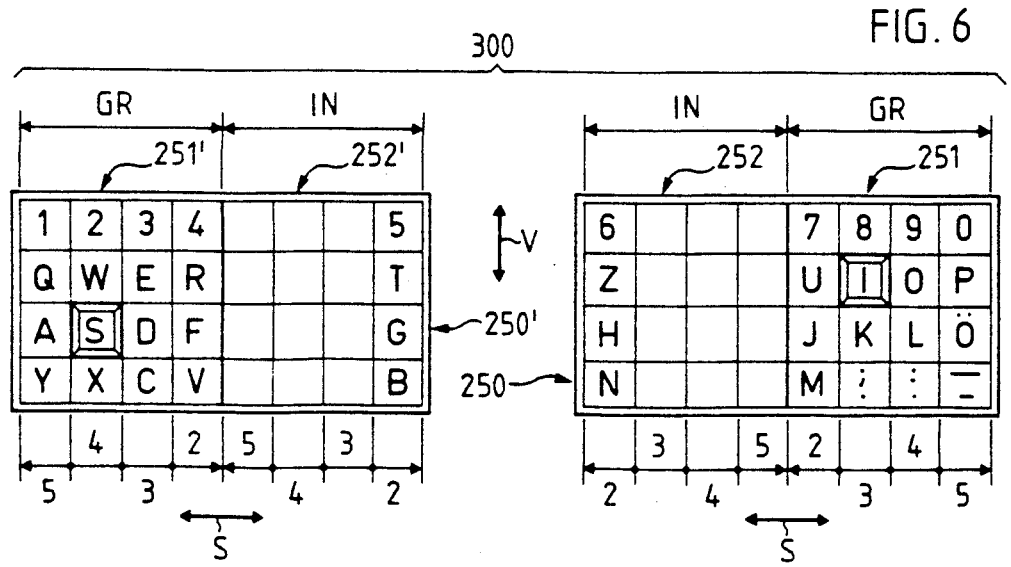
FIG. 6 is a complete key input region for the left and right-handed keyboard, with two key input fields for the two keyboard units.

FIG. 6 shows a key input region of a complete keyboard 300 combined of the two keyboard units 50 and 50' as presented only for the right hand 250 in FIG. 3 and consisting of the partial key input units 250' not specifically presented, with corresponding key partial fields 251' and 252' for the left hand. In this illustration there are also some figures, letters and other symbols indicating the functions of the keys in the same pattern as prescribed by existing norms and standards, the keys to be operated as on a standard typewriter, engaging the same fingers and hand to reach the same symbols with both hands automatically following the combined motions indicated by the arrows S and V. Even the finger positions are identically defined by numbers 2, 3, 4, and 5, as on a conventional typewriter and presented in FIG. 3.

It should be mentioned at this stage, that the keyboard input fields 250, 255 and 260 together with the knob 50 (FIG. 1 and 2) may be arranged in different combinations also with more than two said keyboard knobs in favorable positions to the operator' hands, to use them in turns.

The number of steps in the directions of arrows S and V of the keyboard knob 50 or 50' may be reasonably increased and it is easy even from the described examples presented in FIG. 3, 4, 5, to select a keyboard input field suitable to be operated by a one-handed person, making eventually use of the said secondary keys 60' to 63', thus substituting the missing hand.

The special keyboard unit 50, 50' may be due to the large keyboard input facilities, implemented to operate complex systems as, for instance, handling apparatuses, industrial robots or any machines, demanding the highest key input capacity even with the introduction of key input fields magazines engageable by the command of an input key signal during its operation, raising the keyboard capacity over one thousand inputs by one single key input region.

The embodiments of the invention in which an exclusive property or privilege is claimed are defined as follows:

1. A keyboard unit equipped with a number of ergonomically arranged input keys to operate at least one processor unit operationally connected with said keyboard unit, the keyboard unit having a fixed lower part and a knob-shaped upper part that is adapted to fit into an operator's hand, the knob being movable in two directions perpendicular to one another relative to the fixed lower part, said knob having a front surface with an ergonomically curved row of input keys arranged in a group so as to be actuatable by finger relative to the fixed lower part, and a lateral surface with at least one side input key arranged so as to be actuatable by a thumb relative to the fixed lower part, the fixed lower part comprising a key input field divided into partial input fields and steps in the two directions, each input field having several limited input positions, each of said input keys being arrangeable into several different of said input positions by moving said knob in the two directions.

2. A keyboard unit as claimed in claim 1, having integrated a second group of keys in a parallel step in the knob and having a second key located with the at least one side key.

3. The keyboard unit as claimed in claim 1 wherein the movable knob-shaped upper part is movably connected to the lower part so as to form a single unit that is positionable into a processing system on any level, distance and inclination in relation to the system and to an operator of the system.

4. The keyboard unit as claimed by claim 1, and further comprising means for receiving an input signal from any of said input positions the keyboard knob commands at any moment resulting from the movement of the knob.

5. Keyboard unit as claimed by claim 4, and further comprising means for the transformation of every signal, obtained by an actual step position of the knob and activated through a singular position of any of the keys into a digital signal.

6. The keyboard unit as claimed in claim 4, wherein said receiving means electro-optically receives the input signal.

7. The keyboard unit as claimed in claim 4, wherein said receiving means electro-magnetically receives the input signal.

* * * * *